(12) United States Patent
Shoaf et al.

(10) Patent No.: US 10,813,284 B2
(45) Date of Patent: Oct. 27, 2020

(54) ELECTRIC WALK BEHIND GREENS MOWER

(71) Applicant: Deere & Company, Moline, IL (US)

(72) Inventors: Gilbert Shoaf, Apex, NC (US); James W. Musser, Gary, NC (US)

(73) Assignee: Deere & Company, Moline, IL (US)

( * ) Notice: Subject to any disclaimer, the term of this patent is extended or adjusted under 35 U.S.C. 154(b) by 184 days.

(21) Appl. No.: 16/025,572

(22) Filed: Jul. 2, 2018

(65) Prior Publication Data
US 2020/0000026 A1 Jan. 2, 2020

(51) Int. Cl.
| | | |
|---|---|---|
| *A01D 34/58* | (2006.01) | |
| *A01D 34/00* | (2006.01) | |
| *A01D 34/47* | (2006.01) | |
| *A01D 34/53* | (2006.01) | |
| *A01D 34/84* | (2006.01) | |
| *A01D 69/02* | (2006.01) | |
| *A01D 101/00* | (2006.01) | |

(52) U.S. Cl.
CPC .......... *A01D 34/58* (2013.01); *A01D 34/006* (2013.01); *A01D 34/475* (2013.01); *A01D 34/53* (2013.01); *A01D 34/84* (2013.01); *A01D 69/02* (2013.01); *A01D 2101/00* (2013.01)

(58) Field of Classification Search
CPC .... A01D 34/58; A01D 34/006; A01D 34/475; A01D 69/02; B62D 11/04; B62D 11/02; B62D 11/00
See application file for complete search history.

(56) References Cited

U.S. PATENT DOCUMENTS

| | | | |
|---|---|---|---|
| 2,329,952 A | 9/1943 | Speiser | |
| 2,475,671 A | 7/1949 | McCartney | |
| 2,972,218 A | 2/1961 | Otto | |
| 5,388,661 A * | 2/1995 | Hood, Jr. ........... | A62B 35/0075 182/3 |
| 5,509,258 A | 4/1996 | Thier et al. | |
| 5,518,079 A * | 5/1996 | Zvolanek ........... | A01D 34/6806 180/19.1 |
| 6,523,334 B1 | 2/2003 | Dettmann | |
| 6,758,030 B2 | 7/2004 | Dettmann | |
| 7,007,446 B2 | 3/2006 | Dettmann | |
| 7,111,443 B2 | 9/2006 | Anderson et al. | |

(Continued)

FOREIGN PATENT DOCUMENTS

| | | |
|---|---|---|
| EP | 2639128 A2 | 9/2013 |
| FR | 2414288 A1 | 8/1979 |

(Continued)

OTHER PUBLICATIONS

European Search Report issued in counterpart European Patent Application No. 19179958.4 dated Nov. 28, 2019 (10 pages).

*Primary Examiner* — Tony H Winner

(57) ABSTRACT

An electric walk behind greens mower having a traction drum split into a first half and a second half, each half rotatable at a different speed to provide traction drive and steering for the mower in response to actuation of hand controls by an operator, or in response to commands from an electronic controller based on the signals from a proximity sensor on the mower. The electric walk behind greens mower includes a pair of electric traction drive motors, one of the electric traction drive motors rotating each half of the split traction drum.

9 Claims, 6 Drawing Sheets

(56) References Cited

U.S. PATENT DOCUMENTS

| | | | |
|---|---|---|---|
| 7,168,227 B2 | 1/2007 | Derby et al. | |
| 7,367,173 B2 | 5/2008 | Daly et al. | |
| 7,610,738 B2 | 11/2009 | Daly et al. | |
| 7,954,308 B2 | 6/2011 | Harris | |
| 8,572,940 B2 | 11/2013 | Schmidt et al. | |
| 8,660,744 B2 | 2/2014 | Derby et al. | |
| 9,864,396 B1* | 1/2018 | Brown | A01D 34/006 |
| 2002/0062583 A1* | 5/2002 | Wakitani | B60L 15/2036 |
| | | | 37/246 |
| 2013/0207611 A1 | 8/2013 | Sosnowski | |
| 2014/0174838 A1* | 6/2014 | Oswald | A01D 34/001 |
| | | | 180/6.24 |
| 2015/0175190 A1* | 6/2015 | Ito | B62D 1/02 |
| | | | 180/6.5 |
| 2019/0059214 A1* | 2/2019 | Bagwan | A01D 34/44 |
| 2019/0166758 A1* | 6/2019 | Phillip | A01D 34/66 |

FOREIGN PATENT DOCUMENTS

| | | |
|---|---|---|
| GB | 985287 A | 3/1965 |
| WO | 2004057166 A2 | 7/2004 |

\* cited by examiner

ELECTRIC WALK BEHIND GREENS MOWER

FIELD OF THE INVENTION

This invention relates to grass mowing machines and specifically to electric walk behind greens mowers.

BACKGROUND OF THE INVENTION

An electric walk behind greens mower has a horizontally aligned reel cutting unit that is designed to provide a high quality cut on golf course greens. In the past, some walk-behind greens mowers have been battery powered and/or have used electric motors to rotate the cutting reels and traction rollers or drums. For example, British Patent 985287 relates to a battery-electric mower having separate electric motors for driving the cutting reel and traction roller. Other examples of electric walk behind greens mowers include those manufactured and sold by Atco since the 1950s.

U.S. Pat. Nos. 6,523,334 and 6,758,030 for Battery-powered walk-behind greens mower relate to variable controls such as potentiometers that an operator may use to control the speed of a traction motor and a reel motor. The traction drive may be interrupted by releasing a bail which actuates a switch. The reel motor may be shut down if an electric sensor senses a predetermined low voltage in the battery. The traction or reel motors also may be shut down if sensors built into the motors sense current or heat exceeding predetermined limits. A battery cutout relay may terminate current to the reel motor through an electric contactor. Additionally, closing the key switch activates a time delay module that provides an electrical shutdown system. After a specified time period of non-operation, the time delay module removes power to the entire system.

U.S. Pat. No. 7,007,446 for Battery-powered walk-behind greens mower relates to a greens mower having a controller that communicates with a battery level indicator, card reader and operator presence control system to determine the mode of operation, and to supply or discontinue electrical current to a reel motor and/or traction motor. The controller includes an internal soft start module that limits current applied to the reel motor during start up.

U.S. Pat. No. 7,111,443 for Walk reel mower with electric drive and automatic slow down system relates to a system for automatically slowing a greens mower during turns. A switch may be actuated when the operator pushes down on the handle to lift the reel cutting unit up off the ground, causing a rearward pitching motion of the reel cutting unit. The switch is connected to a motor controller that automatically decreases power flowing from the battery to the traction motor by a predetermined increment.

U.S. Pat. No. 7,168,227 for Internal combustion engine traction drive with electric cutting unit drive for walking greens mower relates to a greens mower controller that controls the rotational speed of an electric reel motor in relation to the detected drive speed of one or more rollers.

U.S. Pat. Nos. 7,367,173 and 7,610,738 for Greens mower data display and controller relate to a mower controller coupled to a data display and controls reel speed and groundspeed. The mower controller may receive groundspeed data from the traction drive system or a sensor coupled to one or more rollers, and reel motor speed and current draw from the cutting reel and motor. The mower controller may disengage the electric motor upon detection of a current spike caused by a jam, or during motor overload or overheating. Mower controllers on several mowers may communicate with a master controller.

U.S. Pat. No. 7,954,308 for Frequency of clip adjustment system and method for reel mower cutting unit relates to a system for adjusting frequency of clip. A reel motor controller determines the required reel speed based on the walk speed, frequency of clip setting from a user interface, and one or more numerical constants specific to the reel mower cutting unit.

U.S. Pat. No. 8,572,940 for Mower with thumb wheel throttle control relates to an electric walk behind greens mower with a thumb wheel that progressively increases and decreases power output of an engine or rotates a potentiometer shaft to change the speed of an electric motor.

U.S. Pat. No. 8,660,744 for Speed control system for walk behind powered equipment relates to operator hand controls used to set the speed of a traction roller. A controller and display may be used to set minimum and maximum speeds of the traction and reel motors.

There is a need for an electric walk behind greens mower that is more maneuverable than existing mowers. There is a need for an electric walk behind greens mower that may be steered and turned around more easily and rapidly. There is a need for an electric walk behind greens mower that reduces the risk of damage to the green during a turn. There is a need for an electric walk behind greens mower that reduces operator time required to mow a golf green. There is a need for an electric walk behind greens mower that does not require operator presence to perform clean-up passes around the edge of the green. There is a need for an electric walk behind greens mower having reduced size and weight, and having a lower cost battery. There is a need for a walk behind greens mower that allows easy battery removal and replacement.

SUMMARY OF THE INVENTION

An electric walk behind greens mower includes a traction drum supporting the mower, split into a left drum and a right drum. A first electric traction drive motor rotates the left drum and a second electric traction drive motor rotates the right drum. The electric walk behind greens mower also includes a pair of control levers on the handle, with each control lever controlling the rotational speed of the electric traction drive motor on the opposite side of the mower. The electric walk behind greens mower may have a clean-up pass feature in which an electronic controller controls the speed of the first electric traction drive motor and the second electric traction drive motor in response to signals the controller receives from a proximity sensor.

DESCRIPTION OF THE PREFERRED EMBODIMENT

Figure 1:
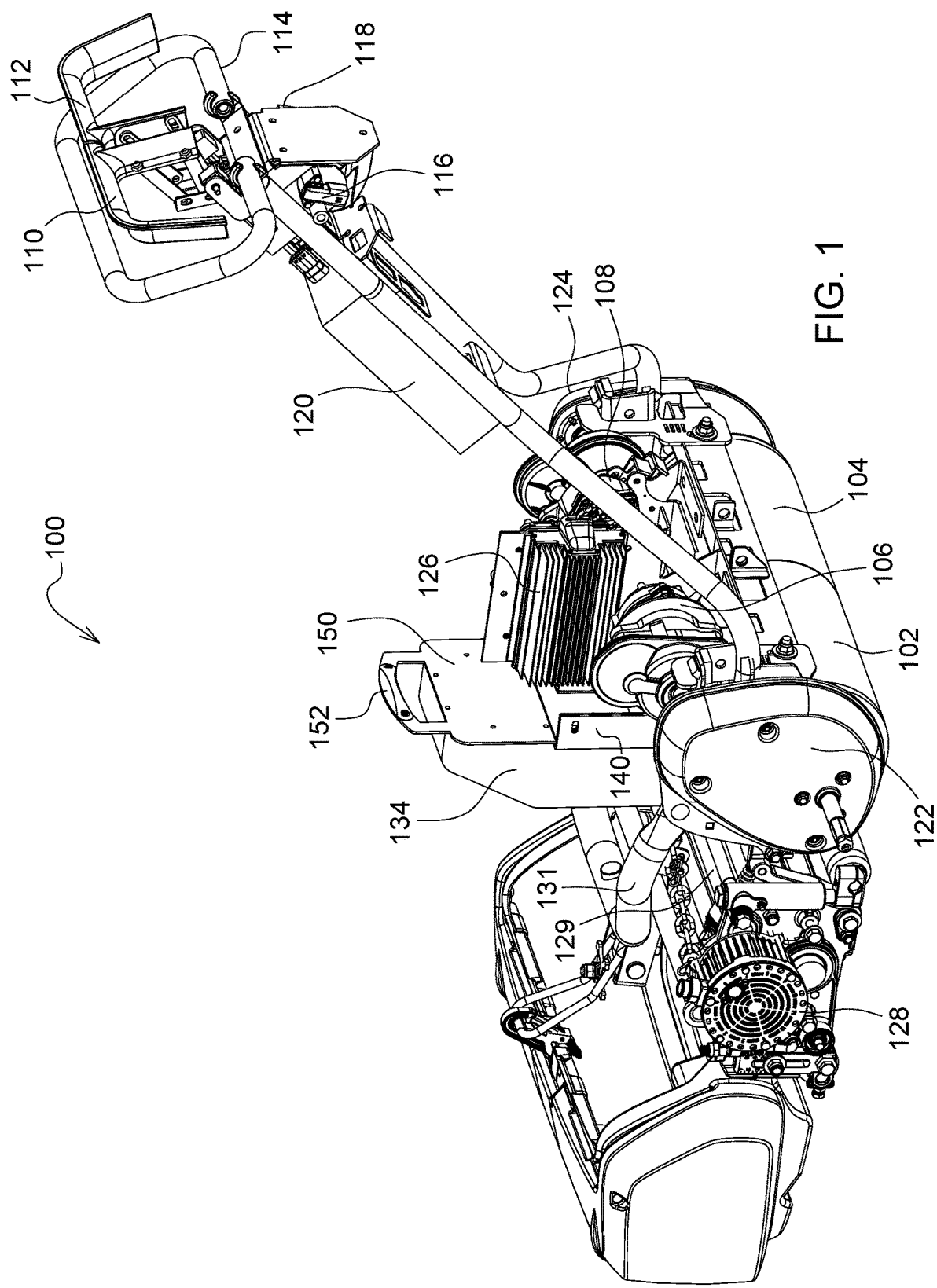
FIG. 1 is a bottom perspective view of an electric walk behind greens mower according to one embodiment of the invention.

In one embodiment, as shown in FIG. 1, electric walk behind greens mower 100 may include a traction drum that is split into two parts consisting of a first or left drum 102 and a second or right drum 104. The first or left drum may rotate independently of the second or right drum. The electric walk behind greens mower also may include two electric traction drive motors 106, 108. First or left electric traction drive motor 106 may drive the first or left drum and second or right electric traction drive motor 108 may drive the second or right drum. The two electric traction drive motors may provide both traction and steering for the mower.

Figure 2:
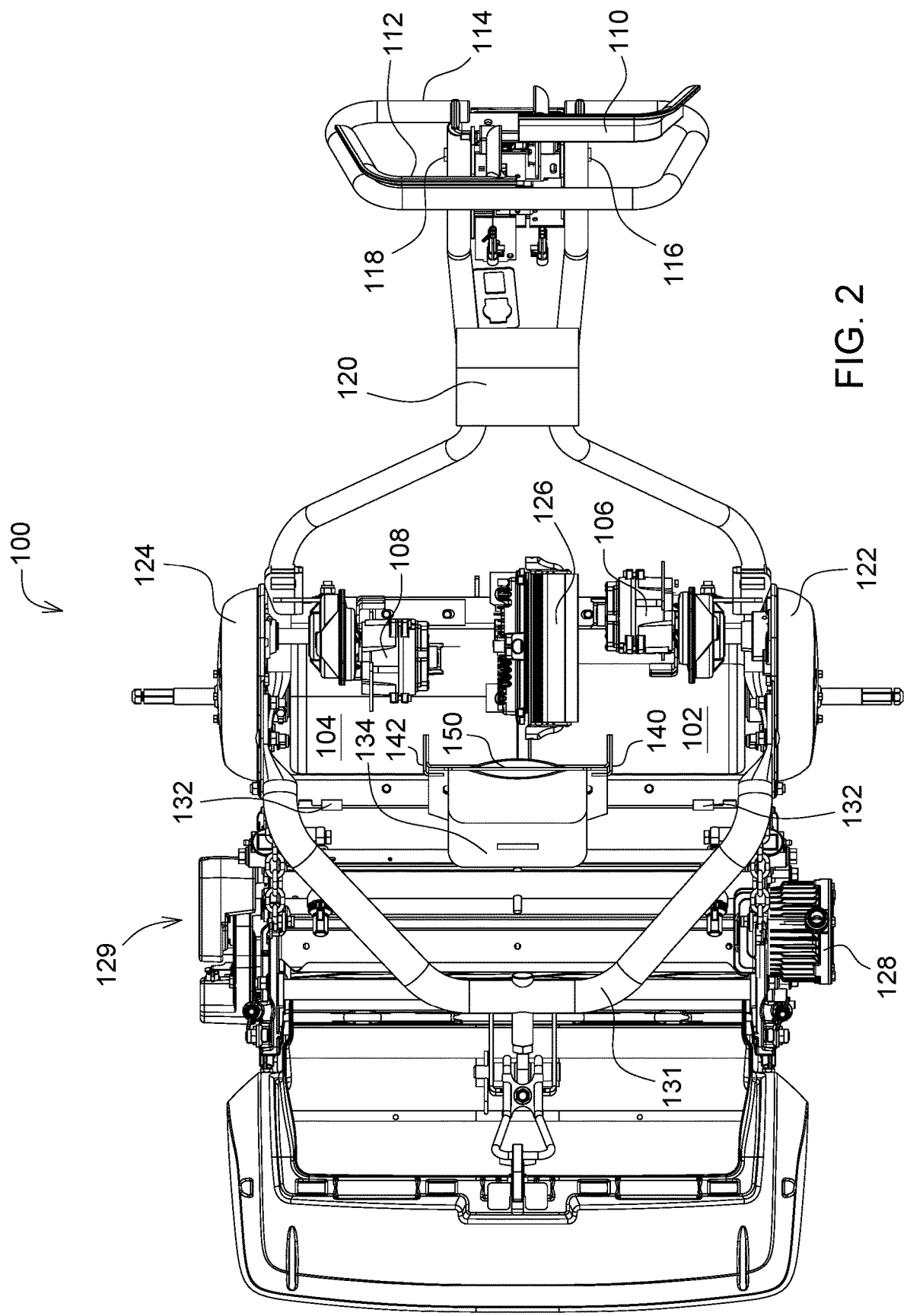
FIG. 2 is a top view of an electric walk behind greens mower according to one embodiment of the invention.

In one embodiment, as shown in FIG. 2, electric walk behind greens mower may include first or left control lever 110 to control the speed of second or right electric traction drive motor 106 and second or right control lever 112 to control the speed of first or left electric traction drive motor 108. Each control lever controls the rotational speed of the electric traction drive motor on the opposite side of the mower. The first and second control levers may be pivotably mounted to mower handle 114, so that the operator may actuate the first and second control levers independently of each other. The operator may pivot or slide each control lever, by pushing or pulling the control lever, from a rest or zero traction speed position to a maximum traction speed position. Based on the position of each control lever relative to the handle, each control lever may actuate a potentiometer 116, 118 which may be signal connected to vehicle controller 120. The vehicle controller may be an electronic controller with software to perform logic and commands to the electric traction drive motors and other devices on the mower. For example, the first and second potentiometers may provide variable electric signals such as voltage signals to the vehicle controller based on the position of the first and second control levers. The vehicle controller may read both potentiometers, and provide a first or left speed signal to first or left electric traction drive motor 106, and a second or right speed signal to second or right electric traction drive motor 108. To provide suitable rotational speed and torque, gearbox 122 may be connected between the first or left electric traction drive motor and the first or left traction drum, and gearbox 124 between the second or right electric traction drive motor and the second or right traction drum.

In one embodiment, electric walk behind greens mower may be steered by an operator squeezing one control lever more than the other control lever. For example, the operator may squeeze the left control lever to turn left, and the vehicle controller may increase the rotational speed of the traction drive motor on the right side of the split traction drum. Similarly, the operator may squeeze the right control lever to turn right, and the controller may increase the rotational speed of the traction drive motor on the left side of the split traction drum. Alternatively, the electric walk behind greens mower may include a remote control system such as Bluetooth, radio, or wifi, including a control unit having a pair of control levers, so that an operator may remotely provide variable electrical inputs to the vehicle controller without walking on the surface of the green.

In one embodiment, as shown in FIG. 2, electric walk behind greens mower 100 may include reel controller 126 which may be signal connected to electric reel motor 128 which rotates a plurality of cutting blades on reel cutting unit 129. The electric reel motor may be attached to one side of the reel cutting unit and may rotate spiral blades about a generally horizontal and laterally extending axis. Yoke 131 may extend forwardly of the reel cutting unit, pulling the reel cutting unit during mowing operations, and supporting a grass catcher in front of the reel cutting unit. The operator may use a switch or lever to actuate the electric reel motor and the reel controller which may provide the desired reel or blade speed to the reel motor. The reel controller may set and adjust the reel or blade speed based on signals from the vehicle controller to match the traction speed of the mower, and to maintain a specified, consistent frequency of clip, which may be set by the operator. Additionally, if the first and second electric traction drive motors 106, 108 are rotating at different speeds, the reel controller may calculate an average speed or RPM of the two electric traction drive motors and set the reel motor speed based on the average.

Figure 4:
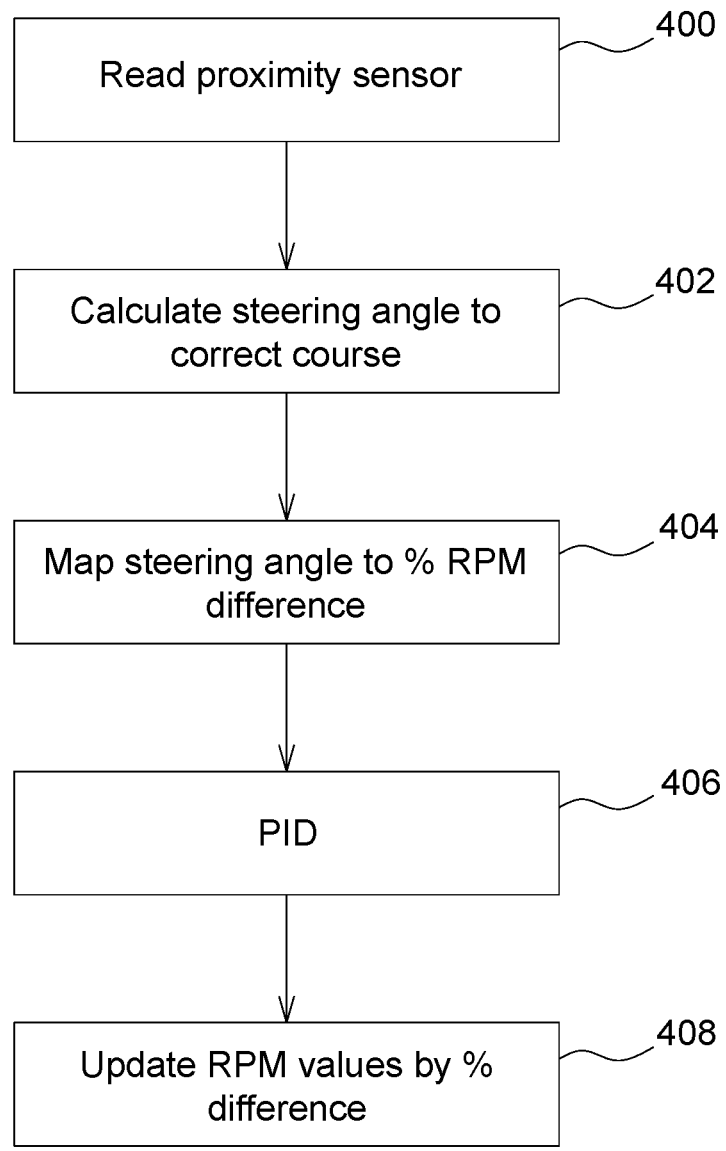
FIG. 4 is a logic diagram of an automated clean-up pass feature on an electric walk behind greens mower according to one embodiment of the invention.

In one embodiment, electric walk behind greens mower 100 may include an automated clean-up pass feature that may be used to mow around the edge of a golf green or other border automatically, without an operator walking behind, steering or guiding the mower. During the automated clean-up pass, electronic controller 120 on the mower may control the speed of the first electric traction drive motor and the second electric traction drive motor in response to signals the controller receives from one or more proximity sensors 132. The operator may actuate a switch on the mower to actuate the automated clean-up pass feature. The switch may cause vehicle controller 120 to implement the automated clean-up pass feature with software based on the steps in the logic diagram of FIG. 4. In block 400, the vehicle controller may read input from proximity sensors 132 on the mower to determine the location of the mower relative to the edge of the green. Any of a variety of different proximity sensors may be included on the mower to detect the edge of the green. For example, the mower may have an electromagnetic sensor that detects electric current through a buried wire around the edge of the green or other border, or may have a laser sensor that detects the edge or border, or may use GPS or radio wave frequency to locate the edge or border. In block 402, the controller may calculate the steering angle of the mower to correct the course of the mower relative to the edge of the green or border. In block 404, the controller may determine or map the steering angle to an RPM difference between the first and second, or left and right, traction motors. In block 406, the controller may perform PID by calculating an error based on position input from the proximity sensors, and adjust the calculated RPM to reduce any error between the proximity sensor input and the desired position. In block 408, the controller may update the RPM values by using the PID output to modify the RPM commands sent to the traction drive motors. For example, when the proximity sensors indicate the mower is close to the desired position, the controller may make only slight adjustments to RPM commands to the traction drive motors. Additionally, the electric walk behind greens mower may have one or more additional sensors, such as ultrasonic sensors, LIDAR or vision sensors, to detect obstacles when using the automated clean-up pass feature.

Figure 5:
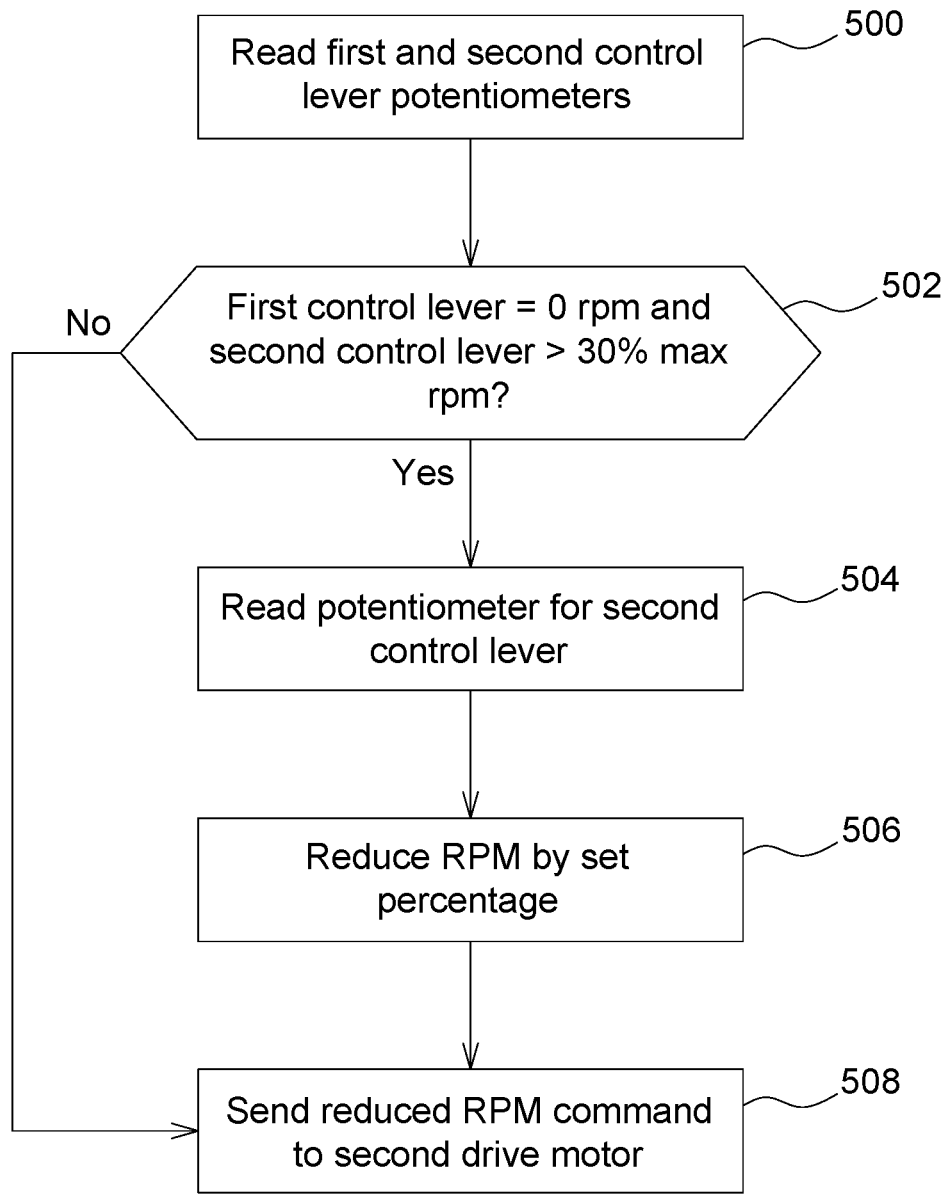
FIG. 5 is a logic diagram of an assisted turn feature on an electric walk behind greens mower according to one embodiment of the invention.

In one embodiment, electric walk behind greens mower 100 may include an assisted turn feature to automatically reduce the speed or slow down one of the pair of electric traction drive motors as the mower is turned around, for example, at the edge of a golf green. The assisted turn feature may be implemented by vehicle controller 120 as shown in the logic diagram of FIG. 5. In block 500, the vehicle controller may read signals from the first and second potentiometers 116, 118 which are actuated by first or left control lever 110 and second or right control lever 112. In block 502, the vehicle controller may determine if the operator has released one of the pair of left and right control levers, so that one of the drums is at zero RPM. More specifically, the vehicle controller may determine if either of the first or second potentiometers is sending a speed signal of 0 RPM, while the second potentiometer signal is signaling at or above a specified speed, such as 30% of a maximum RPM. The 0 RPM signal from only one of the two potentiometers indicates the operator has released one control lever, while still actuating the second control lever. If both conditions in block 502 are satisfied, the vehicle controller may read the speed signal from the second potentiometer in block 504, and then determine a reduced traction drive speed in block 506. For example, the controller may calculate a reduced traction drive speed based as a fixed percentage, such as 50%, of the speed signal from the second potentiometer. The controller then may send the reduced RPM signal to the electric traction drive motor for the second control lever in block 508, along with the 0 RPM signal to the electric traction drive motor for the first control lever. However, if one or both conditions in block 502 are not satisfied, the vehicle controller may continue to send the unmodified speed or RPM signals from each potentiometer to the respective traction drive motor in block 508. Alternatively, the assisted turn feature may be activated by a sensor that detects the edge of the green, instead of being activated by the operator releasing one of the control levers. When the sensor detects the edge of a green, the vehicle controller may then reduce the speed of one of the electric traction drive motors for the turn. Alternatively, the vehicle controller may initiate a specific turn geometry or shape by providing a series of sequential speed commands to each of the two electric traction drive motors to turn around the mower.

Figure 3:
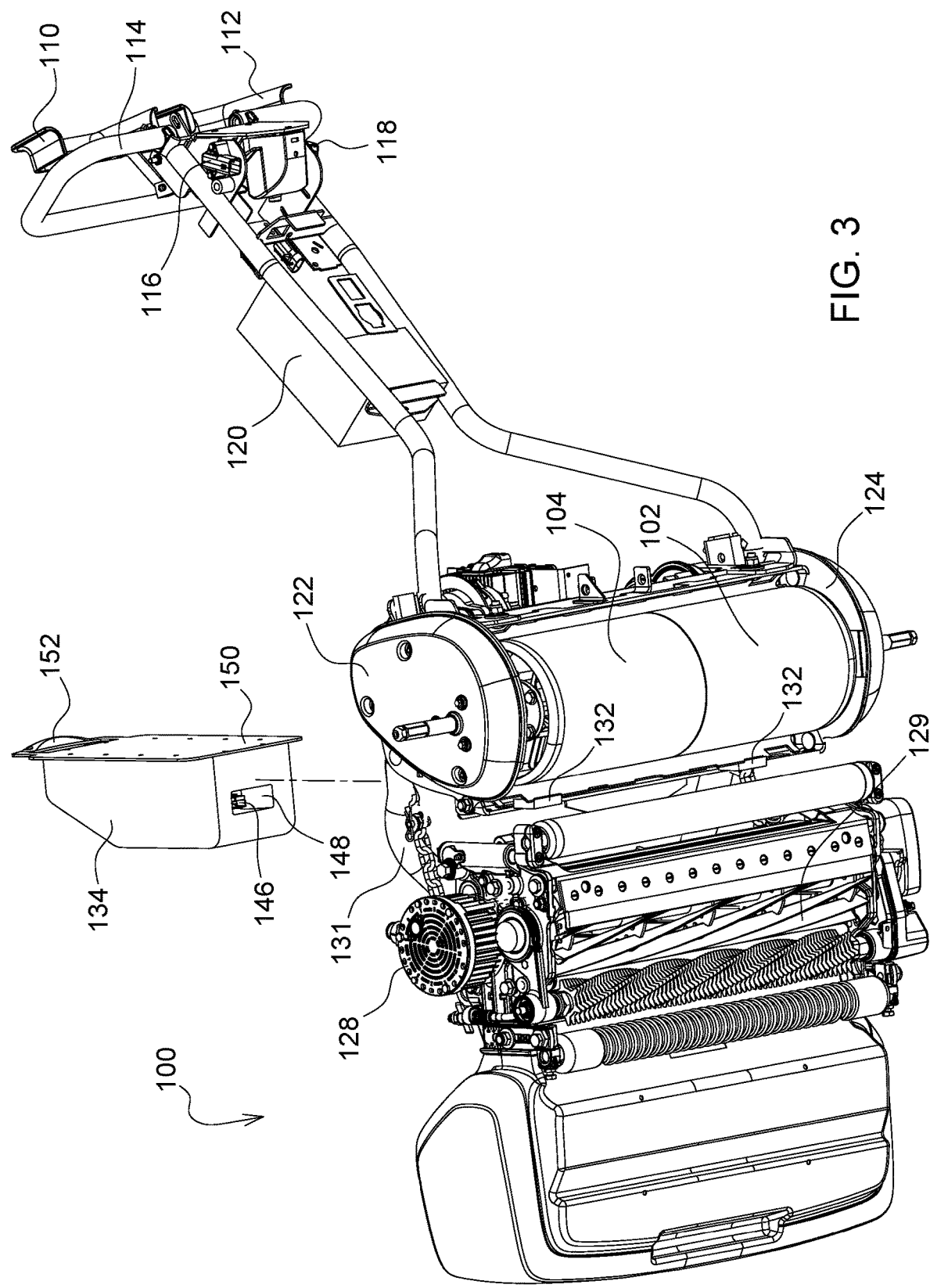
FIG. 3 is a bottom perspective view of an electric walk behind greens mower with the battery and housing removed according to one embodiment of the invention.
Figure 6:
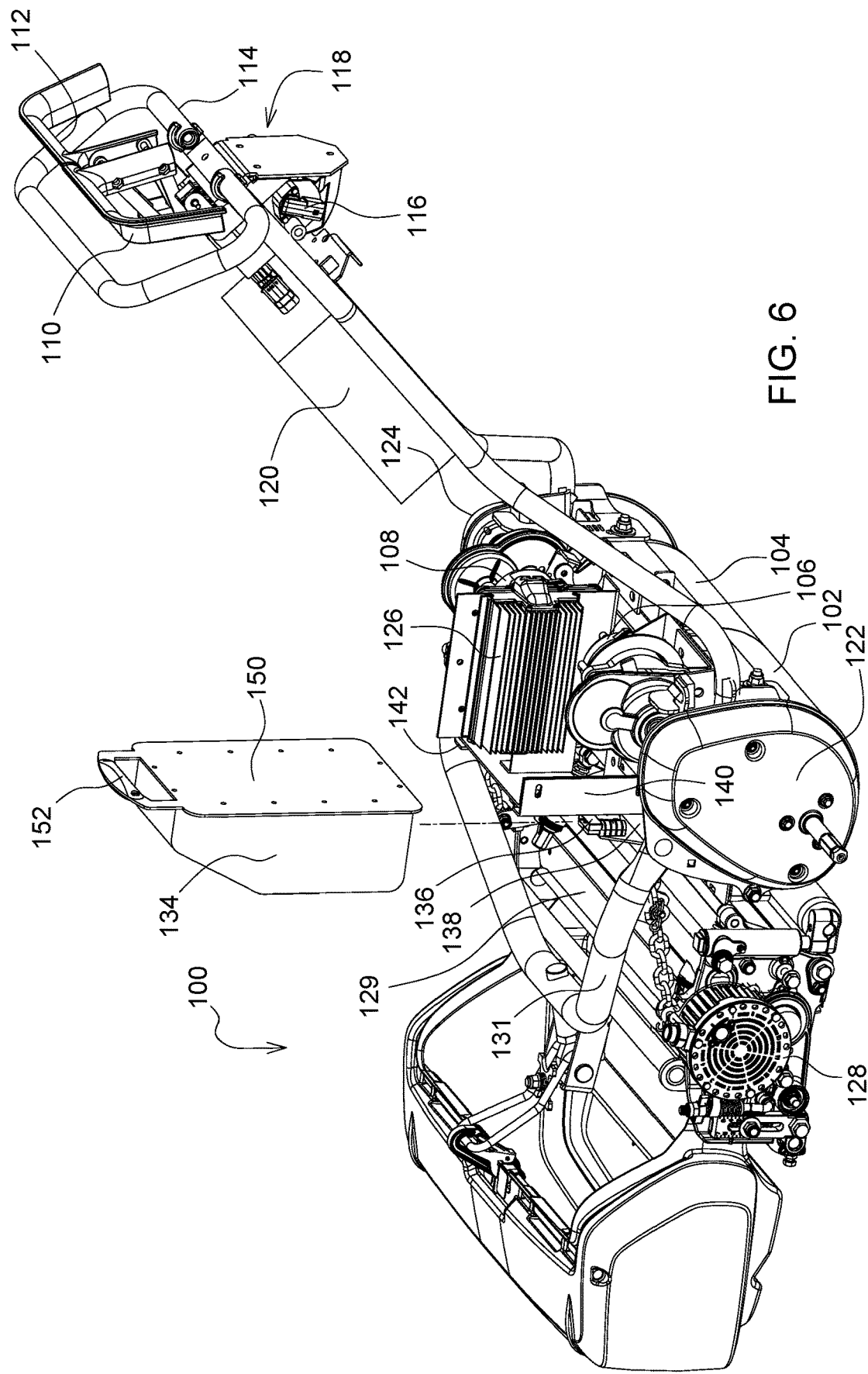
FIG. 6 is a top perspective view of an electric walk behind greens mower with the battery and housing removed according to one embodiment of the invention.

In one embodiment, as shown in FIGS. 3 and 6, electric walk behind greens mower 100 may include easily removable battery housing 134 which houses a 48V battery providing electrical power to both electrical traction drive motors, the reel motor, vehicle controller and reel controller. Upwardly facing power connector 136 may be mounted to bracket 138 on the mower, along with a pair of generally vertical channels or slots 140, 142, one of the channels or slots positioned on each side of the bracket. The battery housing 134 may have a mating downwardly facing connector 146 located in a recess 148 in the bottom of the housing, and a rear plate 150 with side edges that may slide into the vertical channels or slots. The battery housing also may include handle 152 on the upper end so that the operator may easily slide rear plate 150 on the battery housing into or out from the channels or slots using one hand. As rear plate 150 reaches the bottom of the vertical channels or slots, connectors 136, 146 may complete the connection without manually handling the connectors, and the weight of the battery, along with a slight spring load in the connectors, will continue to hold the connectors together while mowing. To remove the battery, the operator may simply lift the battery housing using the handle without handling the connectors, and slide the rear plate out of the vertical channels or slots.

Having described the preferred embodiment, it will become apparent that various modifications can be made without departing from the scope of the invention as defined in the accompanying claims.

The invention claimed is:

1. An electric walk behind mower, comprising:
a traction drum split into a first drum and a second drum, the first drum rotatable at a first rotational speed and the second drum rotatable at a second rotational speed independent of the first rotational speed;
a first control lever pivotably mounted to a handle on the mower for an operator to control the rotational speed of the first drum and a second control lever pivotably mounted to the handle for the operator to control the rotational speed of the second drum for steering of the mower;
a vehicle controller connected to the first and the second control levers and that reduces the rotational speed of the first drum if the second drum is at zero rotational speed; and
a proximity sensor on the mower, wherein the vehicle controller can set the first rotational speed and the second rotational speed to follow a path identified by the proximity sensor.

2. An electric walk behind mower, comprising:
a traction drum supporting the mower, and split into a left drum and a right drum;
a pair of electric traction drive motors on the mower including a first electric traction drive motor rotating the left drum and a second electric traction drive motor rotating the right drum;
a pair of control levers mounted on a handle of the mower including a left control lever controlling a rotational speed of the second electric traction drive motor and a right control lever controlling a rotational speed of the first electric traction drive motor; and
an electronic controller on the mower that controls the speed of the first electric traction drive motor and the second electric traction drive motor in response to signals the controller receives from a proximity sensor.

3. The electric walk behind mower of claim 2 wherein the electronic controller reduces the speed of one of the first electric traction drive motor and the second electric traction drive motor when the mower is turned around.

4. The electric walk behind mower of claim 2 further comprising a battery housing slideable vertically into a bracket on the mower.

5. An electric walk behind mower, comprising:
a traction drum split into a first drum and a second drum, the first drum rotatable at a first rotational speed and the second drum rotatable at a second rotational speed independent of the first rotational speed;
a first control lever pivotably mounted to a handle on the mower for an operator to control the rotational speed of the first drum and a second control lever pivotably mounted to the handle for the operator to control the rotational speed of the second drum for steering of the mower;
a vehicle controller connected to the first and the second control levers and that reduces the rotational speed of the first drum if the second drum is at zero rotational speed; and
an electric reel motor that is speed adjusted based on the rotational speeds of the first drum and the second drum to maintain a specified frequency of clip.

6. The electric walk behind mower of claim 5 further comprising a first electric traction drive motor rotating the first drum and a second electric traction drive motor rotating the second drum.

7. An electric walk behind mower, comprising:
a traction drum split into a first half and a second half, each half rotatable at a different speed to provide traction drive and steering for the mower in response to actuation of hand controls, or in response to commands from an electronic controller based on signals from a proximity sensor on the mower;

a pair of electric traction drive motors, one of the electric traction drive motors rotating each half of the split traction drum; and an electric reel motor for rotating a plurality of spiral cutting blades at a rotational speed based on the rotational speed of the pair of electric traction drive motors.

8. The electric walk behind mower of claim 7 wherein the electronic controller can slow one of the pair of electric traction drive motors during a turn if the other electric traction drive motor is not rotating.

9. The electric walk behind mower of claim 7 further comprising a removable battery housing with a downwardly facing connector that mates with an upwardly facing connector mounted to a bracket on the mower.

* * * * *